United States Patent [19]

Sing

[11] Patent Number: 4,699,252

[45] Date of Patent: Oct. 13, 1987

[54] ROLLING CONTACT SUCTION SYSTEM FOR VEHICLE BRAKING AND ADHESION

[76] Inventor: Peter Sing, 168-10 84th Ave., Jamaica Hill, N.Y. 11432

[21] Appl. No.: 824,157

[22] Filed: Jan. 30, 1986

[51] Int. Cl.[4] .................. B60T 1/14; B62D 55/00; B60B 39/00
[52] U.S. Cl. ......................... 188/5; 180/9.5; 180/15; 180/164; 188/4 B; 305/9
[58] Field of Search .................. 188/4 R, 4 B, 5; 180/15, 190, 124, 164, 9.21, 9.5; 244/110 R, 110 A, 110 H, 111; 305/9, 35 EB

[56] References Cited

U.S. PATENT DOCUMENTS

| | | | |
|---|---|---|---|
| 1,236,971 | 8/1917 | Nakamizo | 188/5 |
| 2,184,664 | 12/1939 | Ehret | 188/5 |
| 2,608,274 | 8/1952 | Kromer | 188/5 |
| 2,974,741 | 3/1961 | Witzmann | 188/5 X |
| 3,062,327 | 11/1962 | Debus | 188/5 |
| 3,116,897 | 1/1964 | Tweed | 188/5 X |
| 3,170,532 | 2/1965 | Boppart | 180/164 |
| 4,044,862 | 8/1977 | Savarimuthu | 188/5 |

FOREIGN PATENT DOCUMENTS

| | | | |
|---|---|---|---|
| 3049620 | 7/1982 | Fed. Rep. of Germany | 188/5 |
| 1266533 | 6/1961 | France | 180/15 |

Primary Examiner—Andres Kashnikow
Assistant Examiner—Robert J. Oberleitner
Attorney, Agent, or Firm—Nathaniel Altman

[57] ABSTRACT

A rolling contact suction system for vehicle braking and adhesion, in one embodiment comprising a suction cylinder adapted to be mounted on a vehicle for rolling contact with the surface upon which the vehicle moves; a plurality of suction disks contained in a surface layer of, and positioned within the profile of, the suction cylinder, the surface layer being made of a resilient material; and passageway within the suction cylinder for allowing the passage way of air from inside each suction disk, operable only when the internal volume of the suction disk is decreased. In another embodiment, the rolling contact suction system for vehicle braking and adhesion comprises a first cylinder adapted to be mounted rotatably on the vehicle so that the cylinder's horizontal main axis is parallel to the vehicle's axles; a second cylinder adapted to be secured to mounted rotatably on the vehicle parallel to, spaced from, and positioned to the rear of, the first cylinder; an endless belt suction tread, mounted around both the first cylinder and the second cylinder, for contact with, and for movement along, the surface upon which the vehicle moves, the suction tread having a plurality of suction disks on its outer surface; and passageway of for air from inside each suction disk operable only when the internal volume of the suction disk is decreased.

22 Claims, 17 Drawing Figures

ROLLING CONTACT SUCTION SYSTEM FOR VEHICLE BRAKING AND ADHESION

BACKGROUND OF THE INVENTION

This invention relates to devices and systems for vehicle braking and for increasing the adhesion between a vehicle and the surface upon which it moves, and more particularly, to such devices and systems utilizing members in rolling contact with the surface upon which the vehicle moves.

SUMMARY OF THE INVENTION

In one embodiment, this invention, a rolling contact suction system for vehicle braking and adhesion, comprises a suction cylinder, adapted to be secured to a vehicle, for rolling contact with the surface upon which the vehicle moves; a plurality of suction disks contained in a surface layer of the suction cylinder, the surface layer made of a resilient material; and means for allowing the passage of air from inside each suction disk operable only when the volume of the suction disk decreases.

In another embodiment, this invention comprises a first cylinder adapted to be secured to a vehicle; a second cylinder adapted to be secured to the vehicle; a suction tread, mounted between the first cylinder and the second cylinder, for contact with the surface upon which the vehicle moves, the suction tread having an array of suction disks on its outer surface; and means for allowing the passageway of air from inside each suction disk operable only when the volume of the suction disk decreases.

Specifics of these embodiments are described below.

BRIEF DESCRIPTION OF THE DRAWING

FIGS. 3A-3C show another embodiment of this invention. Specifically.

FIGS. 4A-4C show another embodiment of this invention. Specifically.

FIGS. 7A-7B show an embodiment of this invention usable with rail-based vehicles. Specifically.

FIGS. 8A-8C show an embodiment of this invention that enables a vehicle to traverse slippery or non-horizontal surfaces. Specifically.

DESCRIPTION OF THE PREFERRED EMBODIMENTS

Figure 1A:
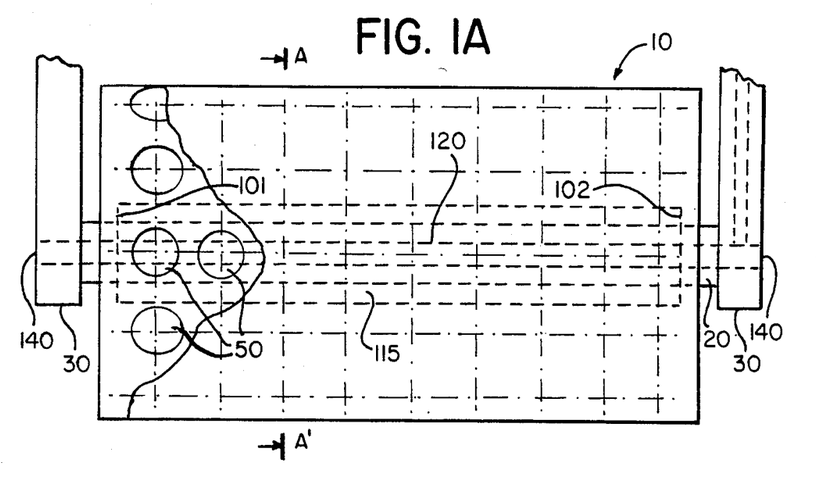
FIG. 1A shows one embodiment of this invention.
Figures 1B, 2:
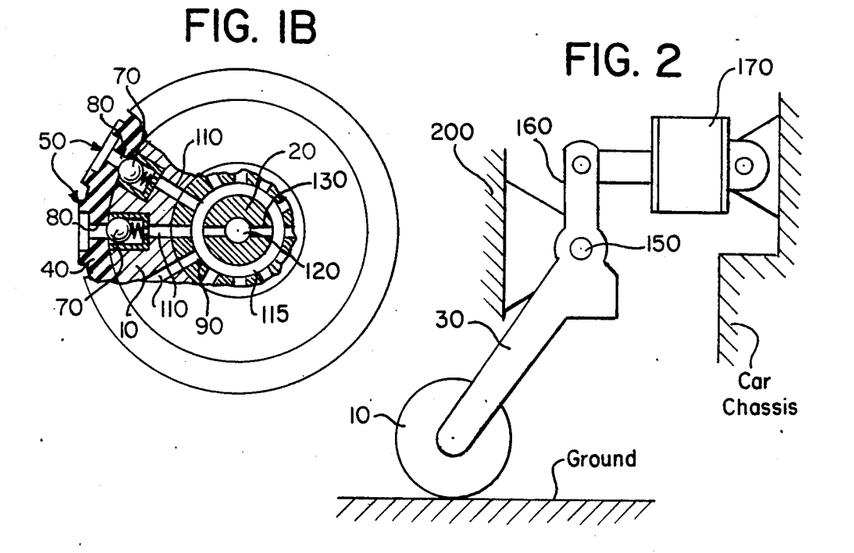
FIG. 1B is a sectional view, taken along line A-A', showing the suction elements and related support elements of this invention.
FIG. 2 is a schematic view of one type of apparatus usable to extend and retract the embodiment of FIGS. 1A-1B.

FIGS. 1A-1B show one embodiment of this invention. Specifically, there is shown a system comprising a suction cylinder 10 mounted on a shaft 20 positioned between two support struts 30. Suction cylinder 10 can rotate on shaft 20 so that suction cylinder 10 can be in rolling contact with a surface.

As seen in FIG. 1B, suction cylinder 10 comprises three distinct annular regions. The outer region, surface layer 40, contains an array of suction disks 50. Surface layer 40 is made of a resilient material.

The next region of suction cylinder 10 is valve region 60. Valve region 60 contains a plurality of check valves 70, each of which communicates with a particular suction disk 50 via a suction disk passageway 80 radially oriented in surface layer 40.

The inner-most region of suction cylinder 10, support region 90, is in rotating contact with shaft 20. Support region 90 contacts shaft 20 only at load bearing portion 101 and load bearing portion 102; the balance of support region 90 constitutes a hollow plenum 115. Each check valve 70 contained in valve region 60 is connected to plenum 115 by a radially-oriented plenum passageway 110. Plenum 115 is connected to a main exhaust passageway 120 in shaft 20 via a plurality of branch exhaust passageways 130 (two can be seen in FIG. 1B). Main exhaust passageway 120 continues through support struts 30 and terminates at openings to the atmosphere 140 in support struts 30. Each check valve 70 is oriented to allow air to flow from its particular suction disk 50 to plenum 115, but not in the reverse direction.

The system just described functions in the following way. When suction cylinder 10 is in contact with a surface and the vehicle to which it is secured moves, suction cylinder 10 will roll on the surface. As it rolls, the resilient material around each suction disk 50 will compress as the suction disk comes into contact with the surface. This compression causes the volume of each suction disk 50 to decrease, which will force air from inside suction disk 50 and exhaust it to the atmosphere via suction disk passageway 80, check valve 70, plenum passageway 110, plenum 115, a branch exhaust passageway 130, and main exhaust passageway 120 to the atmosphere.

Further forward motion of the vehicle yields further rotation of suction cylinder 10, thereby urging each suction disk 50 away from the surface. However, since check valve 70 prevents air from passing from plenum 115 into suction disk 50, suction disk 50 will exert a retarding force until its contact with the surface is broken. This retardant force provides a braking action. Further braking action can be yielded by fitting a braking system, such as conventional caliper disk brakes or shoe brakes, to suction cylinder 10.

Since braking action is automatic when suction cylinder 10 is in contact with a surface and the vehicle is in motion, means are preferably provided for interrupting this braking action by retracting suction cylinder 10 from the surface upon which the vehicle is traveling. One such means is shown in FIG. 2. Specifically, each support strut 30 is attached to a pivot point 150 on the vehicle chassis 200. At least one of the support struts 30 is further connected to a lever arm 160, which in turn is connected to a mechanism that can displace lever arm 160. An hydraulic cylinder 170, as FIG. 2, can be utilized to produce this displacement, although other alternatives are readily apparent. The support struts 30 preferably are mechanically joined to each other so as to distribute loadings to both struts 30 uniformly.

When hydraulic cylinder 170 is retracted, arm 160 is displaced toward hydraulic cylinder 170, thereby causing suction cylinder 10 to be lifted from the surface upon which it rotates, which terminates the braking action. Extension of hydraulic cylinder 170 causes the braking action to resume. After suction cylinder 10 is in contact with the surface, the amount of downward force exerted by suction cylinder 10 on the surface is a function of the distance that hydraulic cylinder 170 is further extended.

Figure 3A:
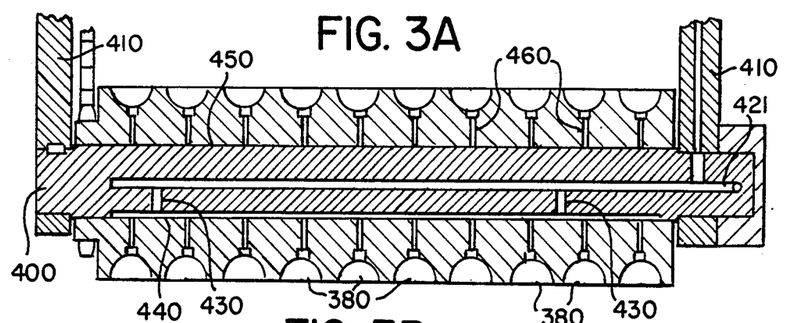
FIG. 3A shows a cross section of one of the at least two cylinders upon which the suction tread of this embodiment is carried.
Figure 3B:
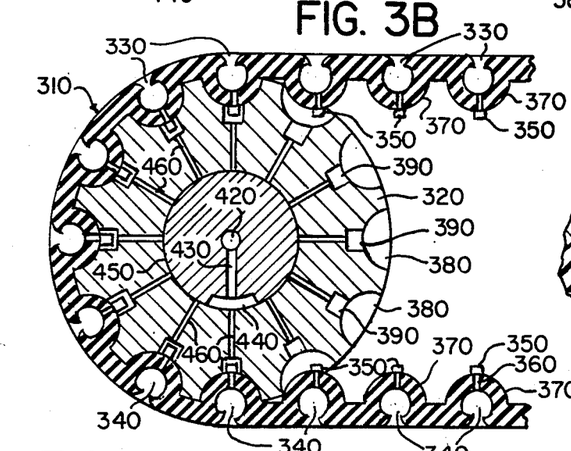
FIG. 3B shows a cut-away view of the forward exhaust cylinder and the suction tread.
Figure 3C:
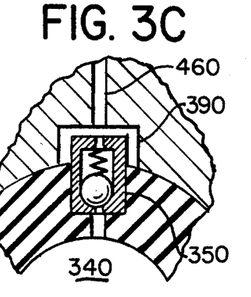
FIG. 3C shows a detailed sectional view of the interface between the forward exhaust cylinder and one suction element of the suction tread.
Figure 4A:
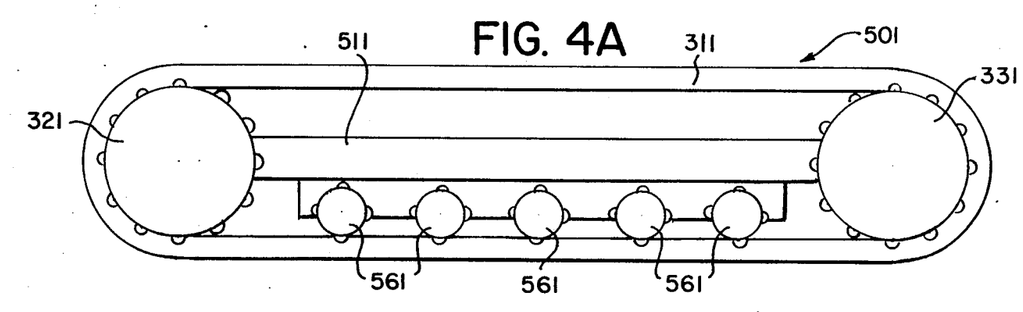
FIG. 4A shows one arrangement of cylinders and suction tread.
Figure 5A:
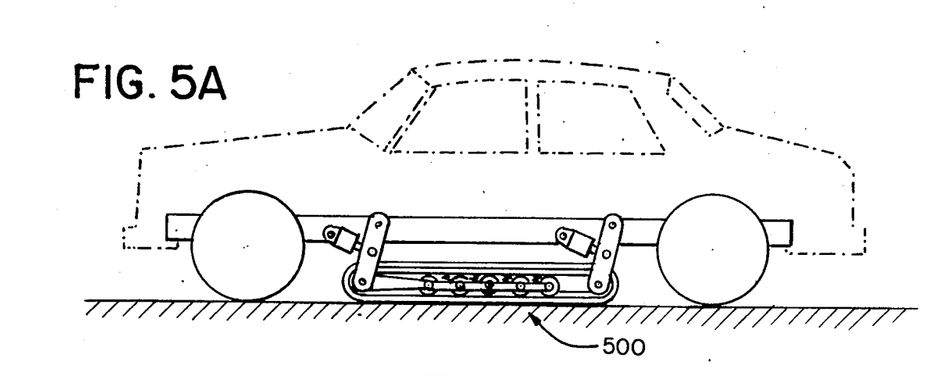
FIG. 5A shows a retractable carriage embodying the present invention.
Figure 5B:
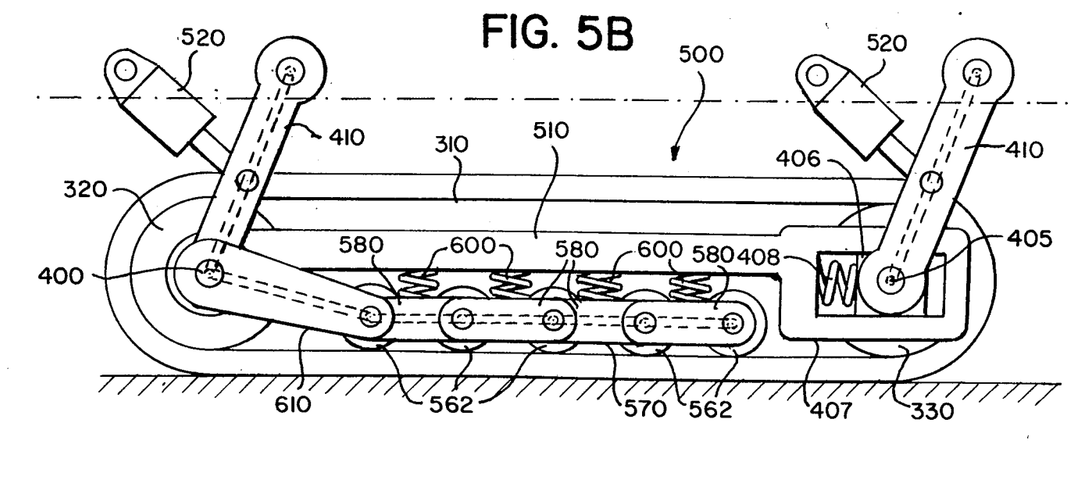
FIG. 5B shows the retractable carriage of FIG. 5A in greater detail.

FIGS. 3A-3C show another embodiment of this invention that is usable with a retractable braking carriage 500, such as shown in FIGS. 4A, 5A and 5B. Referring to FIG. 5B, there is shown a suction tread 310 positioned around forward exhaust cylinder 320 and rear idler cylinder 330. Suction tread 310 is made of a resilient material. Forward exhaust cylinder 320 rotates on a shaft 400 attached to the vehicle on two support struts 410 (only one can be seen in FIGS. 5A-5B). Rear idler cylinder 330 rotates on a shaft 405 also attached to the vehicle on two support struts 410.

As shown in FIG. 3B, suction tread 310 is fabricated with a number of suction elements 330. Each suction element 330 comprises a suction disk 340, a check valve 350, and an air passageway 360. Each suction disk 340 is connected via air passageway 360 to an opening on the inner surface of suction tread 310. A check valve 350 is positioned over each such opening to allow air to flow from suction disk 340 through air passageway 360 and out check valve 350, but not in the reverse direction. The opening, upon which each check valve 350 is positioned, is located at the top of a raised hemispherical region 370.

The suction disks 340 are arranged in lines about the circumference and rows across the width of suction tread 310. The suction disks 340 are at a uniform pitch about the circumference of suction tread 310.

Forward exhaust cylinder 320, as shown in FIGS. 3A-3B, is provided with an array of hemispherical recesses 380. The pitch between the hemispherical recesses 380 about the circumference of forward exhaust cylinder 320 equals the pitch of suction elements 330 about the circumference of suction tread 310. The hemispherical recesses 380 are arranged in lines that correspond with the lines of suction elements on suction tread 10. Consequently, as forward exhaust cylinder 320 rotates, its hemispherical recesses 380 will engage and mesh with the successive rows of hemispherical regions 370 on suction tread 310. Rear idler cylinder 330 is similarly provided with an array of hemispherical recesses 380.

A check valve recess 390 joins each hemispherical recess 380 at the latter's lowest point. These check valve recesses 390 receive the check valves 350 located on the inner surface of suction tread 310 as the latter move around forward exhaust cylinder 320. Each check valve recess in forward exhaust cylinder 320 is connected to an opening on the inner surface 450 of forward exhaust cylinder 320 via an exhaust cylinder passageway 460.

A plenum 440 is cut in shaft 400 and is connected to a shaft exhaust passageway 420 via connecting passageways 430. Plenum 440 is positioned on shaft 440 vertically downwardly, so that air can pass from a particular suction disk 340 to shaft exhaust passageway 420 only when the row in which the particular suction disk 340 resides is in contact with the surface. This positioning allows shaft exhaust passageway 420 to be connected to a vacuum source, such as a vacuum pump or vacuum reservoir, to increase the amount of vacuum that will be developed within the suction disks 340.

Alternatively, shaft exhaust passageway 420 can be connected to the atmosphere. In that case, the amount of vacuum developed within suction disks 340 will be a function of the resiliency of suction tread 310 and the magnitude of the downward force applied by forward exhaust cylinder 320.

The operation of the embodiment shown in FIGS. 3A-3C will be explained by also referring to FIGS. 5A-5B. As the vehicle moves forward, suction tread 310 moves in a counterclockwise direction around forward exhaust cylinder 320. As it does so, check valve recesses 390 receive the check valves 350 located on the inner surface of suction tread 310, and hemispherical recesses 380 receive the hemispherical regions 370 on which are located check valves 350.

The movement of suction tread 310 around exhaust cylinder 320 brings successive rows of suction disks 340 to the vertically downward position on forward exhaust cylinder 320. At approximately that position, the suction disks come into sealing contact with the surface. Downward force from exhaust cylinder 320 causes the resilient material of suction tread 310 to compress, which reduces the volume of suction disks 340. This reduction in volume causes air to flow from each suction disk 340 through its air passageway 360 and check valve 350, and through an exhaust cylinder passageway 460, the plenum 440, a connecting passageway 430 and the shaft exhaust passageway 420.

Further rotation of forward exhaust cylinder 320 causes check valves 350 and hemispherical regions 370 respectively to disengage from check valve recesses 390 and hemispherical recesses 380. Since check valves 350 prevent air from reentering suction disks 340, suction disks 340 are firmly affixed to the surface.

As each row of suction disks 340 rotates past the vertically downward position of rear idler cylinder 330, suction tread 310 will be urged upward. The suction disks 340 will resist this upward urging until their suction hold on the surface is broken. This resistance of suction disks 340 causes a braking action. Further braking action can be yielded by fitting a braking system, such as caliper disk brakes or shoe brakes, to forward exhaust cylinder 320, or to rear idler cylinder 330, or to both.

Retractable braking carriage 500, as shown in FIGS. 5A-5B and as described above, is attached to the vehicle via two pairs of support struts 410. Support struts 410 are pivotally attached to the vehicle and to carriage chassis 510. Shafts 400 and 405 are secured to opposite ends of carriage chassis 510.

Retractable braking carriage 500 is retracted by means of hydraulic cylinders 520 pivotally attached to the vehicle and to intermediate points on support struts 410. The magnitude of the downward force exerted by forward exhaust cylinder 320 on suction tread 310 is governed by the degree of extension of hydraulic cylinders 520.

Figure 4B:
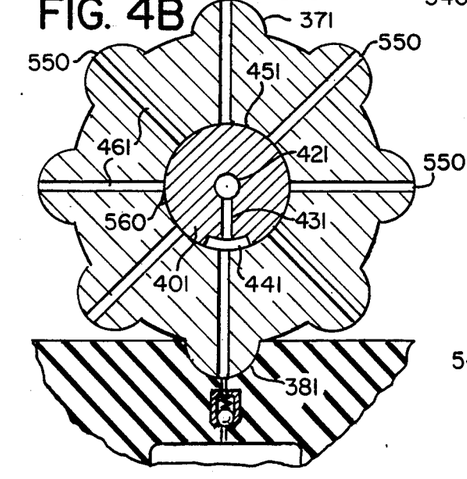
FIGS. 4B and 4C show details of the interface between the suction cylinders and the suction tread of this embodiment.
Figure 4C:
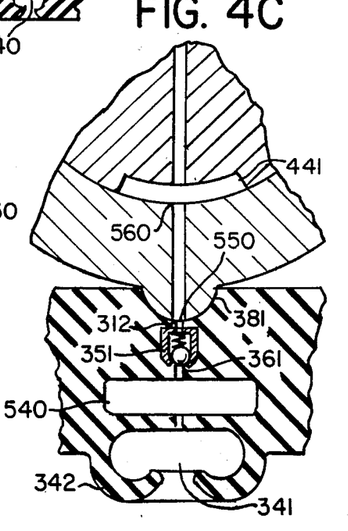

FIGS. 4A–4C show another embodiment of this invention adapted to the retractable braking carriage 500 shown in FIGS. 5A–5B. Specifically, suction tread 311 rotates around forward exhaust cylinder 321 and rear idler cylinder 331. Suction tread 311 is provided with an array of suction elements 329, each comprising a suction disk 341, a check valve 351, an air passageway 361 and a vacuum reservoir 540. Within the thickness of suction tread 311, vacuum reservoir 540 and check valve 351 are interposed in the air passageway 361. Each of the suction disks 341 of the embodiment shown in FIGS. 4A–4C has an inwardly turned contact lip 342 to aid creation of a relatively airtight seal when suction disk 341 is pressed against the surface upon which the vehicle moves. The layout of suction disks 341 on suction tread 311 is the same as described for suction disks 340 on suction tread 310.

The air passageway 361 connects each suction disk 341 with an opening 312 located in a hemispherical suction tread recess 381 on the inner surface of belt 341. Each check valve 351 is oriented to allow air to flow from suction disk 341 to the opening located in hemispherical suction tread recess 381, but prevent flow in the reverse direction.

Forward exhaust cylinder 321 rotates on a shaft 401 provided with a plenum 441 located approximately at the vertically downward position on shaft 401. Plenum 441 communicates with a shaft exhaust passageway 421 via connecting passageways 431 (only one connecting passageway is seen in FIG. 4B). Shaft exhaust passageway 421 is connected either to the atmosphere or to a vacuum source, such as a vacuum pump or vacuum reservoir.

Forward exhaust cylinder 321 is provided with a plurality of raised hemispherical regions 371 positioned on forward exhaust cylinder 321 so as to matingly engage with hemispherical suction tread recesses 381. Rear idler cylinder 331 is similarly provided with a plurality of raised hemispherical regions 371. With respect to forward exhaust cylinder 321, an opening 550 is located on each hemispherical region 371 so as to communicate with opening 312 located in each hemispherical suction tread recess 381. Each opening 550 communicates with an opening 560 on the inner surface 451 of forward exhaust cylinder 321 via an exhaust cylinder passageway 461.

The embodiment shown in FIGS. 4A–4C functions in the same way as the embodiment shown in FIGS. 3A–3C. Carriage chassis 511, shown in FIG. 4A, is additionally provided with a plurality of auxiliary cylinders 561, with hemispherical regions 371, in rolling contact with suction tread 311. These auxiliary cylinders can also be provided openings 550 and 560, exhaust cylinder passageways 461, and be mounted on shafts 401 having plenums 441, connecting passageways 431 and shaft exhaust passageways 421, to increase further the suction force between suction tread 311 and the surface. Rear cylinder 331 can also be similarly provided and mounted on such shafts to obtain yet more of an increase in suction force prior to release of suction disks 340 from the surface.

FIG. 5B shows a system for effectively transferring downward force to the auxiliary cylinders, denominated 562 in FIG. 5B. Auxiliary cylinders 562 are mounted on an articulated bogie 570. Articulated bogie 570 comprises a plurality of load beams 580 joining the support shafts 590 around which rotate the auxiliary cylinders 562. A compression spring 600 is positioned between carriage chassis 510 and each load beam to urge the auxiliary cylinders 562 against the surface.

One end of swing arm 610 is pivotally attached to carriage chassis 510 at the point where shaft 400 joins chassis 510. The other end of swing arm 610 is pivotally attached to beam 580. Swing arm 610 thereby secures articulated bogie 570 in its proper position.

Shaft 405 (on which rear idler cylinder 330 turns) is secured to a slide 406 positioned in a yoke 407 that is located at the rear of carriage chassis 510. A spring 408 is positioned between slide 406 and yoke 407 to urge slide 406 rearward, thus keeping suction tread 310 taut.

Since retractable braking carriage 500 is indeed retractable, suction tread 310 may not be moving at the same speed as the vehicle when carriage 500 is extended. The rapid acceleration of suction tread 310 upon contacting the surface can abrade suction tread 310. Such abrasion can be avoided by accelerating and synchronizing suction tread 10 to the speed of the vehicle prior to extending retractable braking carriage 500.

Figure 6:
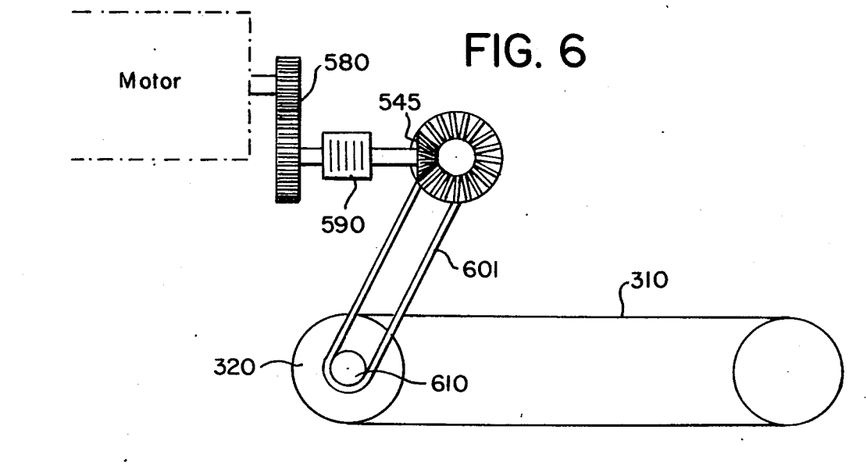
FIG. 6 shows a mechanism for synchronizing the speed of the suction tread used on a carriage, such as that shown in FIGS. 5A-5B, with the speed of the vehicle.

Means for so synchronizing suction tread 10 are shown in FIG. 6. Specifically, a gear train 580, connected to the vehicle's motor or engine, or to some other source of rotating movement, delivers power to a clutch 590. Clutch 590, when engaged, delivers power to bevel gears 595 that are connected via a belt 601 to a pulley 610 fixed on or fixed relative to forward exhaust cylinder 320.

Extension of retractable braking carriage 500 can be initiated manually, or by an automatic control system. Manual or automatic initiation should occur when the vehicle is sensed to be skidding, or otherwise not developing satisfactory or full wheel traction. For automatic initiation, an appropriately programmed microprocessor can receive information from one or more sensors and determine if extension of retractable braking carriage 500 should occur. If the microprocessor determines that extension is necessary, it can send signals to appropriate transducers that cause extension of hydraulic cylinders 520.

Various sensors can be used to send information to the microprocessor. For example, sensors that detect vehicle acceleration, deceleration, wheel rotational speed and steering wheel position can be used. A hardwired logic chip, or a number of such chips, can be used in lieu of a programmed microprocessor.

Figures 7A, 7B, 8C:
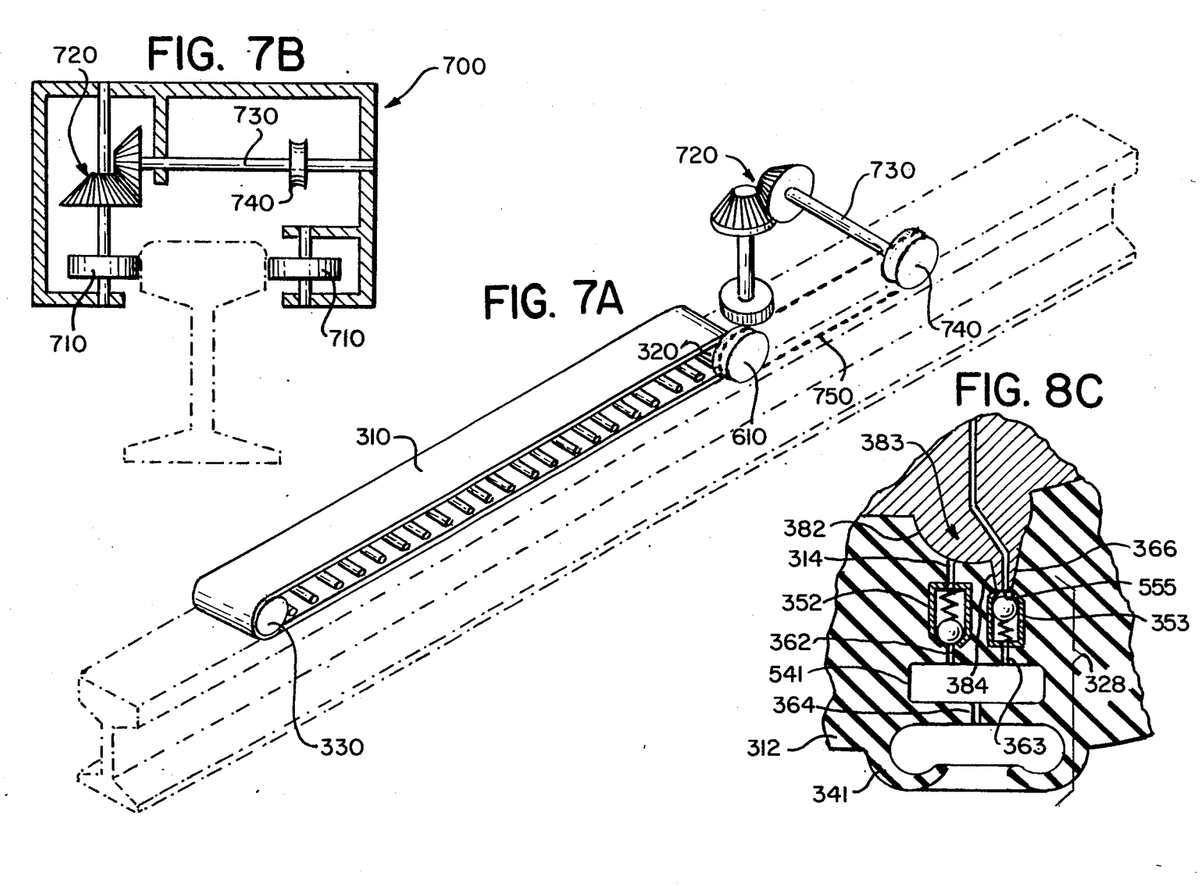
FIG. 7A shows an isometric schematic view of the embodiment and FIG. 7B shows a portion of the mechanism for synchronizing the speed of the suction tread with the speed of the rail-based vehicle.
FIGS. 8B-8C show the interface between the rear idler cylinder and the suction tread.

FIGS. 7A–7B show an embodiment of this invention adapted for a rail-guided vehicle. The width of suction tread 310 is approximately the same as the width of the rail. Also shown are means for synchronizing the speed of suction tread 310 with the speed of the vehicle. Specifically, housing 700 is restrained in its proper position with respect to a rail by guide rollers 710 having vertically oriented shafts. One of the shafts is connected to a set of bevel gears 720 to provide rotational movement of horizontally oriented shaft 730. Shaft 730 is provided with a pulley 740 that is connected via a belt 750 to pulley 610 fixed on or fixed relative to forward exhaust cylinder 320, as shown in FIG. 7A, or rear idler cylinder 330.

This invention can be readily adapted to aid a vehicle in traversing a slippery or non-horizontal surface. For example, by connecting either forward exhaust cylinder 321 or rear idler cylinder 331 (or both) of the embodiment shown in FIGS. 4A–4C with a drive motor, carriage 501 can be used as the mechanism propelling a vehicle on a surface. When this invention is so used, means can be provided for dissipating the suction force developed by each suction disk just prior to the suction disk moving past the vertically downward position on rear idler cylinder 331.

Figure 8A:
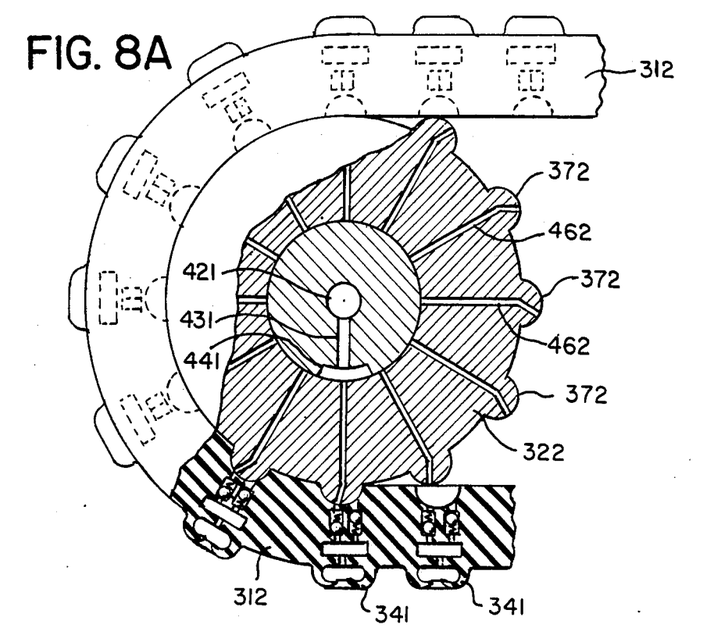
FIG. 8A shows the interface between the forward exhaust cylinder and the suction tread.
Figure 8B:
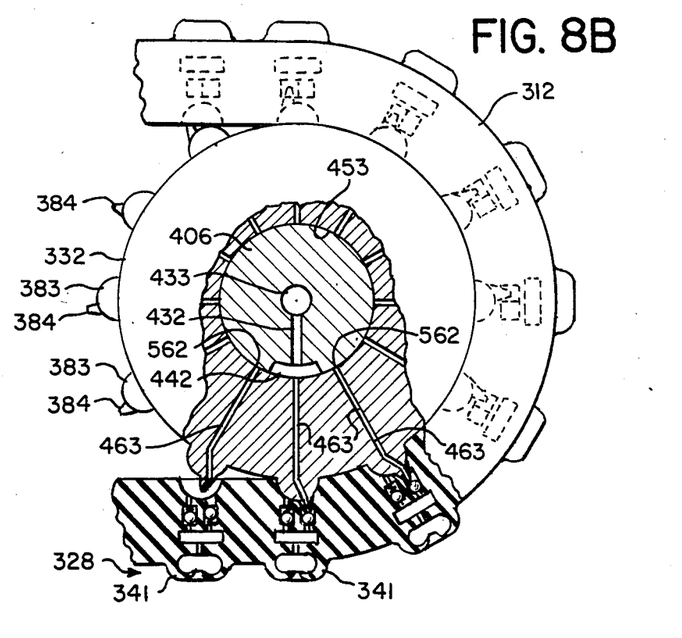

Suitable modifications to this invention implementing such means are shown in FIGS. 8A-8C. Specifically, suction tread 312 shown in FIGS. 8A-8C is provided with an array of suction elements 328, each comprising a suction disk 341, an exhaust check valve 352, a relief check valve 353, an exhaust air passageway 362, a relief air passage 363, a vacuum reservoir 541 and a reservoir air passageway 364. Reservoir air passageway 364 connects suction disk 341 with vacuum reservoir 541. Exhaust air passageway 362 connects vacuum reservoir 541 with an opening 314 located in a hemispherical suction tread recess 382 located on the inner surface of suction tread 312. Exhaust check valve 352 is interposed in exhaust air passageway 362. Exhaust check valve 352 is oriented to allow air to flow from inside suction disk 341 to and through opening 314 via exhaust air passageway 362, vacuum reservoir 541 and reservoir air passage 364, but prevent flow in the reverse direction.

Relief air passageway 363 connects vacuum reservoir 541 with a relief notch 366 located in each hemispherical suction tread recess 382. Relief check valve 353, a spring-loaded ball check valve, is interposed in relief air passageway 363 and oriented to allow air to flow from hemispherical suction tread recess 382 to suction disk 341 via relief notch 366, relief air passageway 363, vacuum reservoir 541 and reservoir air passageway 364, but prevent flow in the reverse direction. However, the spring force that urges the ball of check valve 353 against its seat is sufficiently strong such that the vacuum developed in suction disk 341 is insufficient to lift the ball from its seat. The ball of check valve 353 is accessible from hemispherical suction tread recess 382 through relief notch 366, and can be urged off its seat by pressing against it with a sufficient amount of force.

Forward exhaust cylinder 322, shown in FIG. 8A, is substantially identical in form and function with forward exhaust cylinder 321 shown in FIGS. 4A-4C, except that each of the exhaust cylinder passageways 462, otherwise identical to each of the exhaust cylinder passageways 461, is oriented to line up with opening 314 when the hemispherical projections 372 located on forward exhaust cylinder 322 engage and mesh with the hemispherical recesses 382 located on suction tread 312. Thus, when each suction disk 341, as it moves in a counter-clockwise direction around forward exhaust cylinder 322, reaches about the vertically downward position, air can pass from the suction disk 341 to plenum 441 via reservoir air passageway 364, vacuum reservoir 541, exhaust air passageway 362, opening 314, exhaust cylinder passageway 462, and then out from plenum 441 via passageway 431 and passageway 421.

Rear idler cylinder 332, shown in FIG. 8B, rotates on a shaft 406 provided with a plenum 442 cut in shaft 406 at about the vertically downward position. Plenum 442 is connected to a shaft air relief passageway 433 via connecting passageways 432 (only one is seen in FIG. 8B). Each hemispherical region 383 on rear idler cylinder 332 is provided with a probe 384 suitably shaped and oriented to fit through relief notch 366 and press against the ball of check valve 353, when hemispherical region 383 engages and meshes with hemispherical recess 382 at about the vertically downward position. Probe 384 will therefore urge the ball of check valve 353 off its seat and allow air to pass through relief passageway 363 and into suction disk 341 via vacuum reservoir 541 and vacuum passageway 364.

An opening 555 is located at the end of each probe 384 and communicates with a corresponding opening 562 on the inner surface of rear idler cylinder 332 via an idler cylinder relief passageway 463. Shaft air relief passageway 433 is open to the atmosphere. Thus, as each suction disk 341 of belt 312 engages with a hemispherical projection 383 on idler cylinder 332, the ball in relief check valve 353 is urged off its seat by probe 384. Air then can pass from shaft air relief passageway 433 via connecting passageways 432, plenum 442, opening 562, idler cylinder relief passageway 463, opening 555, relief check valve 353, relief passageway 363, vacuum reservoir 541 and vacuum passageway 364. This air dissipates the suction developed by suction disk 341. In consequence, suction disk 341 can be easily lifted off the surface it formerly adhered to as it rotates past the vertically downward position on rear idler cylinder 331.

I claim:

1. A rolling contact suction system for vehicle braking and road adhesion, comprising:
    (a) a suction cylinder adapted to be mounted on a vehicle for rolling contact of the suction cylinder with a surface on which the vehicle moves;
    (b) a plurality of suction disks contained in, and substantially recessed within the profile of, a resilient surface layer of the suction cylinder;
    (c) means for allowing the passage of air into the suction cylinder from inside each suction disk, operable only when the internal volume of the suction disk is decreased, which comprises a suction disk passageway connected to an internal opening in each suction disk and a check valve for preventing passage of air from the suction cylinder via the suction disk passageways into each suction disk;
    (d) a non-rotating shaft for carrying the suction cylinder concentrically therewith and rotatably thereabout;
    (e) means for attaching the shaft to the vehicle so that, when the vehicle is moving on the surface, the suction cylinder may be placed in rolling contact with the surface on which the vehicle moves;
    (f) a plenum located within, and being recessed into the inner surface of, the suction cylinder, each suction disk passageway being connected with the plenum; and
    (g) means for allowing the egress of air from the plenum comprising a main exhaust passageway in the shaft connected to the plenum by a branch passagewat connecting the main exhaust passageway to an opening to the plenum on the surface of the shaft.

2. The suction system as in claim 1, further comprising means for retracting the suction cylinder from contact with the surface upon which the vehicle moves.

3. A rolling contact suction system for vehicle braking and adhesion, comprising:
    (a) a first cylinder adapted to be mounted rotatably on a vehicle so that the horizontal axis of the first cylinder is disposed in substantially transverse relationship to the forward direction of movement of the vehicle;

(b) a second cylinder adapted to be mounted rotatably on the vehicle parallel to, spaced from, and positioned to the rear of the first cylinder;

(c) a resilient endless belt suction tread, mounted for rotation around both the first cylinder and the second cylinder, for contact with a surface on which the vehicle moves, the suction tread having a plurality of suction disks distributed throughout, and substantially recessed within the profile of the outer surface of the endless belt suction tread; and (d) means for allowing the passage of air into at least one of the first and second cylinders from inside each suction disk, which means being operable only when the internal volume of the suction disk is decreased.

4. The suction system as in claim 3, wherein the means for allowing the passage of air through the endless belt suction tread from inside each suction disk, which is operable only when the internal volume of the suction disk is decreased, comprises:

(a) a suction disk passageway for allowing air to pass from an opening inside the suction disk through the suction tread when the internal volume of the suction disk is decreased; and (b) a check valve for preventing passage of air via the suction disk passageway into the suction disk.

5. The suction system as in claim 4, further comprising:

(a) a plurality of projections on the inside surface of the suction tread, the opening at which each suction disk passageway terminates being on a projection;

(b) a plurality of recesses on the first cylinder and the second cylinder for engaging and meshing with the projections on the inside surface of the suction tread; and (c) a plurality of first cylinder passageways in the first cylinder, each connected to an opening in each recess, for permitting the egress of air from the opening at which each suction disk passageway terminates.

6. The suction system as in claim 5, further comprising:

(a) a first non-rotating shaft for carrying the first cylinder concentrically and rotatably thereon;

(b) a second non-rotating shaft for carrying the second cylinder concentrically and rotatably thereon;

(c) means for mounting the first shaft and the second shaft parallelly to each other and to the axles of the vehicle so that, when the vehicle is moving on the surface, the endless belt suction tread may be placed in contact with the surface;

(d) a plenum recessed into the surface of the first shaft, which plenum is connected to a main exhaust passageway in the first shaft; and (e) a plurality of first cylinder passageways each extending from the outer surface to an opening on the inner surface of the first cylinder.

7. The suction system as in claim 6, further comprising:

(a) the plenum being located on the first shaft so that any first cylinder passageway is only open to the plenum when the particular suction disk, which the first cylinder passageway is connected to, is about in the vertically downward position on the surface of the first cylinder; and (b) a vacuum source connected to the main exhaust passageway.

8. The suction system as in claim 4, wherein each check valve for preventing passage of air via the suction disk passageway into the suction disk is located on the opening on the inside surface of the suction tread.

9. The suction system as in claim 4, wherein each check valve for preventing passage of air via the suction disk passageway into the suction disk is interposed in the suction disk passageway within the thickness of the suction tread.

10. The suction system as in claim 4, further comprising:

(a) a plurality of recesses on the inside surface of the suction tread, the opening at which each suction disk passageway terminates being inside a recess;

(b) a plurality of projections on the first cylinder and the second cylinder for engaging and meshing with the recesses on the inside surface of the suction tread; and (c) a plurality of first cylinder passageways in the first cylinder, each connected to an opening on each projection, for permitting egress of air from the opening at which each suction disk passageway terminates.

11. The suction system as in claim 3, further comprising means for retracting and extending the first cylinder and the second cylinder so that the suction tread is selectively placed movable in and out of contact with the surface upon which the vehicle moves.

12. The suction system as in claim 11, further comprising means for synchronizing the speed of the suction tread with the speed of the vehicle, prior to extending the first cylinder and second cylinder.

13. The suction system as in claim 3, wherein each suction disk has an has an inwardly turned contact lip to aid creation of a relatively airtight seal when suction disk is pressed against the surface upon which the vehicle moves.

14. A rolling contact system for the braking and road adhesion of a vehicle comprising:

(a) a first cylinder adapted to be mounted rotatably on the vehicle so that the horizontal main axis of the first cylinder is parallel to the axles of the vehicle;

(b) a second cylinder adapted to be mounted rotatably on the vehicle parallel to, spaced from, and positioned to the rear of, the first cylinder;

(c) a resilient endless belt suction tread, mounted between for rotation around both the first cylinder and the second cylinder, for selective contact with the surface upon which the vehicle moves, the suction tread having a plurality of suction disks distributed throughout and substantially recessed within the profile of its outer surface;

(d) means for allowing the passage of air into at least one of the first and second cylinders from inside each suction disk, which means being operable only when the internal volume of the suction disk is decreased; and (e) means for dissipating the suction force developed in each suction disk just prior to the suction disk being urged away from the surface upon which the vehicle is moving as the suction disk is carried around the second cylinder.

15. The suction system as in claim 14, wherein the means for allowing the passage of air from inside each suction disk, which means being operable only when the internal volume of the suction disk is decreased, comprises:

(a) an exhaust air passageway for allowing air to pass from an opening inside each suction disk through the suction tread when the internal volume of the suction disk is decreased; and (b) an exhaust check valve for preventing passage of air via the exhaust air passageway into the suction disk.

16. The suction system as in claim 15, wherein each exhaust air passageway terminates at an opening on the inside surface of the suction tread.

17. The suction system as in claim 16, wherein each exhaust check valve is interposed in its respective exhaust air passageway within the thickness of the suction tread.

18. The suction system as in claim 17, further comprising:

(a) a plurality of recesses on the inside surface of the suction tread, the opening at which each exhaust air passageway terminates being inside a recess;

(b) a plurality of projections on the first cylinder and the second cylinder for engaging and meshing with the recesses on the inside surface of the suction tread; and (c) a plurality of first cylinder passageways in the first cylinder, each connected to an opening on each projection, for permitting the egress of air from the opening at which each exhaust air passageway terminates.

19. The suction system as in claim 18, further comprising:

(a) a first non-rotating shaft for for carrying the first cylinder concentrically, supportively and rotatably thereon;

(b) a second non-rotating shaft for for carrying the second cylinder concentrically, supportively and rotatably thereon;

(c) means for mounting the first shaft and the second shaft parallelly to each other and to the axles of the vehicle so that when the vehicle is moving on a surface, the endless belt suction tread may be placed in contact with the surface;

(d) a plenum recessed into the surface of the first shaft, which plenum is connected to a main exhaust passageway in the first shaft; and (e) a plurality of first cylinder passageways each extending from the outer surface to an opening on the inner surface of the first cylinder.

20. The suction system as in claim 19, further comprising:

(a) the plenum being located on the first shaft so that any first cylinder passageway is only open to the plenum when a particular suction disk, which the first cylinder passageway is connected to, is about in the vertically downward position on the surface of the first cylinder; and (b) a vacuum source connected to the main exhaust passageway.

21. The suction system as in claim 20, wherein the means for dissipating the suction force developed in each suction disk comprises:

(a) a relief passageway connected to an opening in the suction disk;

(b) a relief valve for blocking the flow of air through the relief passageway to the suction disk; and (c) means for opening the relief valve just prior to the suction disk being urged away from the surface as it is carried around the second cylinder.

22. The suction system as in claim 21, wherein the means for opening each relief valve comprises a probe located on each projection on the second cylinder, the probe adapted to open a relief valve connected to a suction disk when the recess associated with the suction disk engages a projection on the second cylinder.

* * * * *